July 14, 1959

K. C. D. HICKMAN 2,894,879

MULTIPLE EFFECT DISTILLATION

Filed Feb. 24, 1956

INVENTOR.
Kenneth C.D. Hickman
BY
ATTORNEY.

July 14, 1959     K. C. D. HICKMAN     2,894,879

MULTIPLE EFFECT DISTILLATION

Filed Feb. 24, 1956     3 Sheets–Sheet 3

INVENTOR.
Kenneth C. D. Hickman
BY
ATTORNEY

United States Patent Office 2,894,879
Patented July 14, 1959

2,894,879
MULTIPLE EFFECT DISTILLATION

Kenneth C. D. Hickman, Rochester, N.Y.

Application February 24, 1956, Serial No. 567,612

19 Claims. (Cl. 202—45)

This invention relates to new and useful improvements in the art of distillation of liquids and has particular reference to multiple effect distillation apparatus and methods for achieving multiple effect distillation.

Multiple effect distillation systems for distilling liquids such as sea water have been known heretofore, but the heat requirements of known systems are such that it has not until recently been economically feasible to obtain sufficiently large quantities of fresh water for industrial or municipal purposes. Recompression distillation systems offer considerable improvement in obtaining economical distillation, and in my Patent No. 2,734,023 I have described a new type of phase separation barrier for substantially increasing the yield in recompression distillation systems. The present invention employs rotary phase separation barriers of the type described in said patent in a multiple effect still to achieve thermal distillation of sea water with an efficiency approaching that of centrifugal compression distillation whereby the efficiency of the system is greatly improved over any known forms of multiple effect distillation. The present system includes a series of such rotary phase separation barriers and the residues and distillates are passed through the successive stages of the series to obtain maximum use of the energy in the form of heat which is put into the system.

A principal object of the invention is to provide a new and improved multiple effect distillation system.

Another object of the invention is to provide an improved method of effecting distillation of liquids.

A further object of the invention is to provide a multiple effect still which is highly efficient and adapted to economically provide large quantities of potable water from sea water.

Another object of the invention is to provide a multiple effect still adapted to employ any one of a wide variety of sources of heat.

Other and further objects of the invention will be apparent from the following description and claims and may be understood by reference to the accompanying drawings, of which there are three sheets, which by way of illustration show preferred embodiments of the invention and what I now consider to be the best mode in which I have contemplated applying the principles of my invention. Other embodiments of the invention may be used without departing from the scope of the present invention as set forth in the appended claims.

Figure 1:
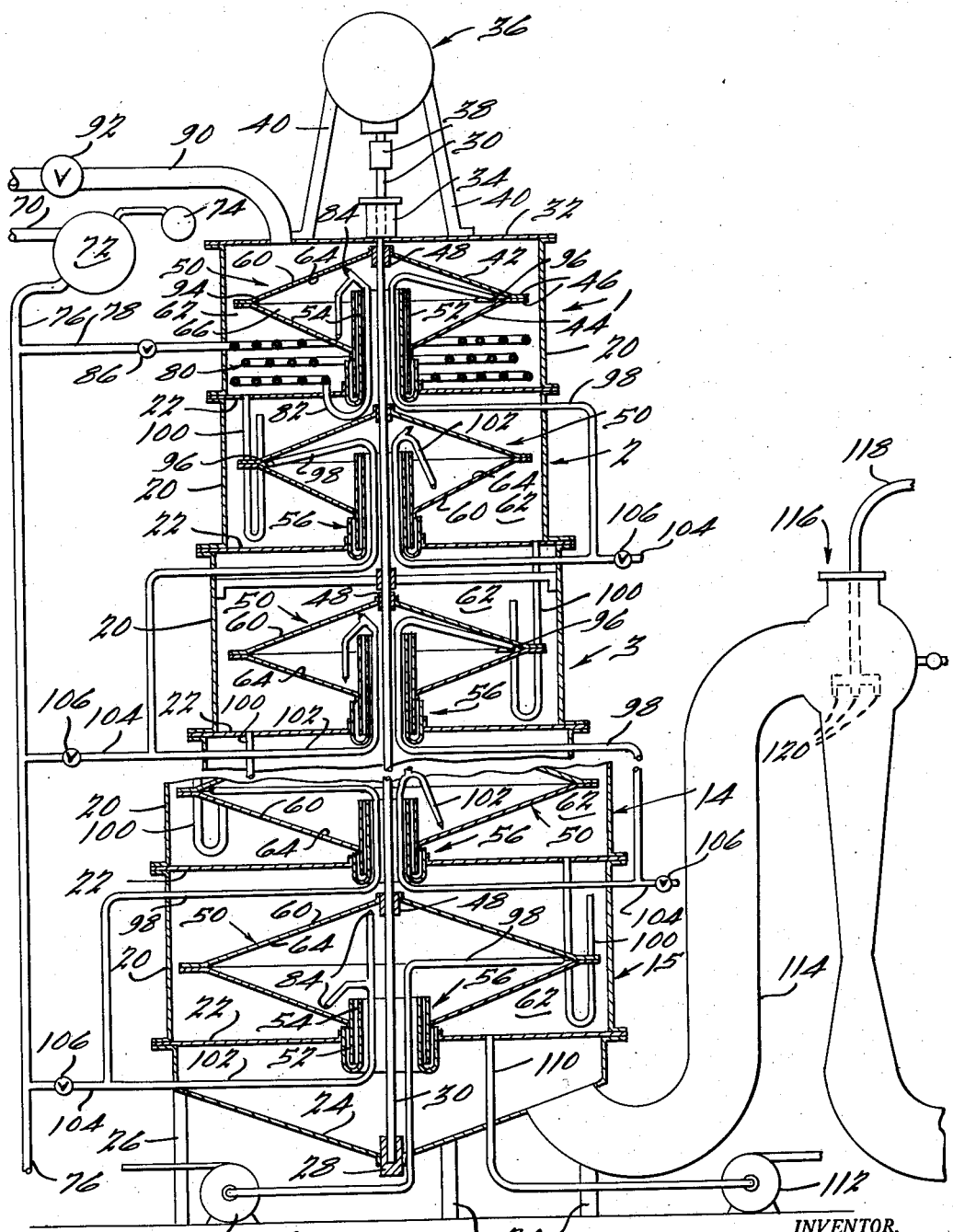
Fig. 1 is a generally schematic fragmentary vertical sectional view of one form of the invention.

Fig. 1 illustrates a multiple effect still for distilling liquids such as sea water, for example. The still comprises a casing structure made up of a vertical series of generally cylindrical casings each of which defines a separate distilling stage. A relatively great number of stages are employed, and in the illustrated form of the invention it is intended that fifteen of such stages would be employed. The stages are numbered from 1 through 15, beginning with the first stage at the top of the structure. The lower stage 15 includes a cylindrical casing 20 closed at the bottom thereof by a plate 22 which is supported on a base member 24 supported by legs 26. Each of the other stages includes a cylindrical casing 20 and the plates 22 separate the successive stages from each other. In the form of the invention shown in Fig. 1 the casings 20 are of progressively decreasing diameter toward the top of the structure.

The base member 24 is provided with a bearing 28, and a vertically disposed shaft 30 has its lower end journaled in the bearing 28 and passes upwardly through all of the stages in the series. The upper end of the shaft 30 passes through the cover plate 32 of the stage 1 and through a suitable bearing and stuffing box 34. The shaft 30 is driven from a suitable motor 36 through a coupling 38. The motor 36 is supported on the cover plate 32 by legs 40. The motor 36 may be an electric motor or a gas turbine or steam turbine, as desired. Each of the stages 1 to 15 has a phase separation barrier therein. The barriers are all of similar construction but may be increased in size progressing downwardly through the stages. Such barriers are generally of the type disclosed in my aforesaid patent and consist of a pair of conical disks 42 and 44 joined together at their peripheral flanges 46. The disk 42 is rigidly secured on shaft 30 by means of a sleeve 48. All of the barriers, which are indicated generally at 50, are similarly secured on shaft 30 for rotation therewith upon operation of motor 36. The disk 44 of each barrier 50 is provided with a central opening within which is secured a cylindrical tube 52. Each of the separator plates 22 is provided with a centrally disposed opening within which is secured a cylindrical sleeve 54. The sleeves 54 are concentric with tubes 52 and are spaced slightly therefrom. At their lower ends the sleeves 54 are bent around the lower ends of tubes 52 to define a liquid trap or seal 56 therewith. The cylindrical tubes 52 rotate with the barriers 50 within the annular traps 56 which are filled with liquid to form a seal between the successive stages.

The disks 42 and 44 forming the barriers 50 are made of relatively thin sheet material having high thermal conductivity. The outer sides of the barriers 50 form condensing surfaces 60 exposed within the condensing chambers 62 defined by the casing structure. The interior of the barriers forms an evaporating chamber and the inner side of each barrier forms an evaporating surface 64 exposed to its evaporating chamber 66.

The feed liquid or distilland, which may be sea water in the present instance, is supplied from a pipe 70 through a degasser 72 to pipe 76. The degasser 72 may be evacuated by a pump 74. A conduit 78 connected to pipe 76 is connected to one end of heat exchange coil 80 located within the condensing chamber 62 of stage 1. The other end of the heat exchange coil is connected to a conduit 82 which passes upwardly through the sleeve 54 into the evaporating chamber within the barrier in stage 1. The distilland flows through conduit 78 and heat exchanger 80 and conduit 82 conveys such distilland to the evaporating surfaces 64 of the first barrier 50. The conduit 82 has nozzles 84 which flow the distilland onto the evaporating surfaces adjacent the center thereof where they will be spread outwardly in a thin film due to the centrifugal force applied thereto by rotation of the barriers. A suitable valve 86 in conduit 78 meters the quantity of distilland supplied through the heat exchanger 80. A pipe 90 having a valve 92 therein is adapted to supply heat to stage 1 of the series and such heat may be in the form of steam at a temperature of about 225° F. If steam is employed as the source of heat, it may be obtained from any suitable source, and if the motor 36 is a steam turbine, the exhaust steam therefrom may serve as the source of heat supplied to the system through pipe 90.

As the distilland passes through the heat exchanger 80 it is heated to near distilling temperature and passes into pipe 82 and is distributed through nozzles 84 onto the evaporating surface of the rotary barrier 50 in stage 1. The barrier 50 is also heated by the steam within condensing chamber 62 in stage 1 and, as described in said prior patent, the barriers upon rotation thereof are adapted to spread and flow the distilland in a thin film over the evaporating surface so as to separate residue from said film while vapor is evolved therefrom. The vapor evolved within the barrier in stage 1 passes downwardly through the central sleeve 54 into the condensing chamber 62 of stage 2. The undistilled liquid or residue centrifugally collects in the peripheral gutter 94 formed at the meeting edges of the disks 42 and 44 and such residue is picked up by a stationary scoop 96 formed on the end of a tube 98 which passes through the sleeve 54 and through the cylindrical wall of the next lower stage, the energy imparted to such residue being utilized to effect the flow thereof through tube 98. The steam supplied to stage 1 will condense on the condensing surface 60 of the barrier and will also condense on the heat exchange coil 80. The condensate formed on the barrier will be flung off of the barrier due to centrifugal force and all of the condensate from the barrier and the heat exchanger passes through a trapped pipe 100 extending into the next lower stage. The barriers 50 are rotated at a speed sufficient to cause distilland to spread and flow radially outwardly over the evaporating surfaces in a film substantially thinner than can be obtained by flow of such distilland of the same throughput over the same surface under the influence of gravity alone, and preferably at a speed such that the distilland will be subjected to a centrifugal force about equal to or greater than ten times the force of gravity. The condensates will also be subjected to such force and will therefore be flung off of the barriers to maintain the condensate in a thin film on the barrier and prevent accumulation of condensate thereon.

Each of the succeeding stages 2 to 15 are provided with distributing pipes 102 similar to the pipe 82 which supplies distilland from the heat exchanger to the barrier in stage 1. Each of the remaining barriers in the series is also provided with a scoop tube 98 for picking up the residues within the barriers. The residue from each evaporating chamber is conveyed by a pipe 98 to the distributor pipe 102 of the succeeding stage in the series so that the residue from one stage is applied to the evaporating surface of the succeeding stage. Additional distilland may be added to the residues through pipes 104 controlled by valves 106 and connected into the main feed line 76. The vapor evolved within each barrier passes therefrom into the condensing chamber in the succeeding stage in the series where it condenses on the barrier in such stage and the distillate from each stage passes into the next lower stage through the pipe 100. It will thus be seen that all of the residues and distillates are passed successively through the several stages and that the distilland supplied at each stage after the first consists of the residue from the preceding stage to which a metered amount of additional feed may be added to make up the volume supplied to each barrier to the proper amount. From stage 15 the residue picked up by the pipe 98 therein is withdrawn by a pump 108. The cumulative distillate in stage 15 is withdrawn through a pipe 110 by a pump 112. The vapor evolved within the barrier in stage 15 passes downwardly into the hollow base member 24 where it is drawn off through a pipe 114 communicating with a condenser indicated at 116 which may be supplied with sea water through pipe 118 and nozzles 120. The jet type condenser illustrated represents a relatively economical means of withdrawing the final volume of steam generated in stage 15, but any other suitable means such as a heat exchanger fed with cold water may be employed if desired.

It is apparent that the invention here disclosed may be employed for distilling liquids or solutions other than sea water, although the invention is particularly suited for the distillation of sea water and has been described in connection therewith.

It is contemplated that the original distilland which may comprise sea water at 60° F. will be heated to about 205° F. in the heat exchanger. Assuming that distilland is admitted by valve 86 at the rate of 1,000 pounds per hour, about 160 pounds of steam will condense on the heat exchanger 80 and an additional 100 pounds of steam will condense on the outer side 60 of the barrier in stage 1. The heat of condensation passes through the walls defining the barrier and about 100 pounds of steam at 205° F. will be generated on the inside of the barrier from the 1,000 pounds of sea water supplied to the interior of the barrier. This latter quantity of steam, together with the condensates from stage 1, passes into stage 2 to supply heat thereto. The residue of 900 pounds of sea water may be made up to approximately 1,000 pounds by the addition of cold water through valve 106, which brings the combined feed consisting of residue and cold water to the temperature appropriate to that stage. The residues and distillates pass through the succeeding stages in a similar manner and the successive stages operate at progressively lower temperatures. It has been found that greater quantities of cold make-up feed water are required, progressing downwardly through the system in order to maintain the combined feed at the proper temperature. The distillates and residues are discharged from the last stage in the series about 20° above the temperature of the cold feed. It is contemplated that about 2,335 pounds of additional feed will be supplied through the several stages, making a total feed of 3,335 pounds per hour from which about 2,490 pounds of distillate are removed, leaving a brine residue of 12 percent salt. The pressure of the steam at each stage falls, progressing downwardly through the stages and, in order to maintain this condition, it may be desirable to provide for a slight leakage of steam between successive stages. Such leakage may be provided by small orifices in the separator plates 22 if desired, or the liquid seals 56 may be replaced by labyrinth type seals which allow passage of a small quantity of steam from one stage to the next. A vacuum pump may be attached to the last stage in the system to provide successively lower pressures in the several stages. The heat exchange coil 80 and the jet type condenser 116 may be considered as additional stages in the system so that the still actually consists of 15 rotary stages and 2 stationary stages to provide a 17-effect still.

Figure 2:
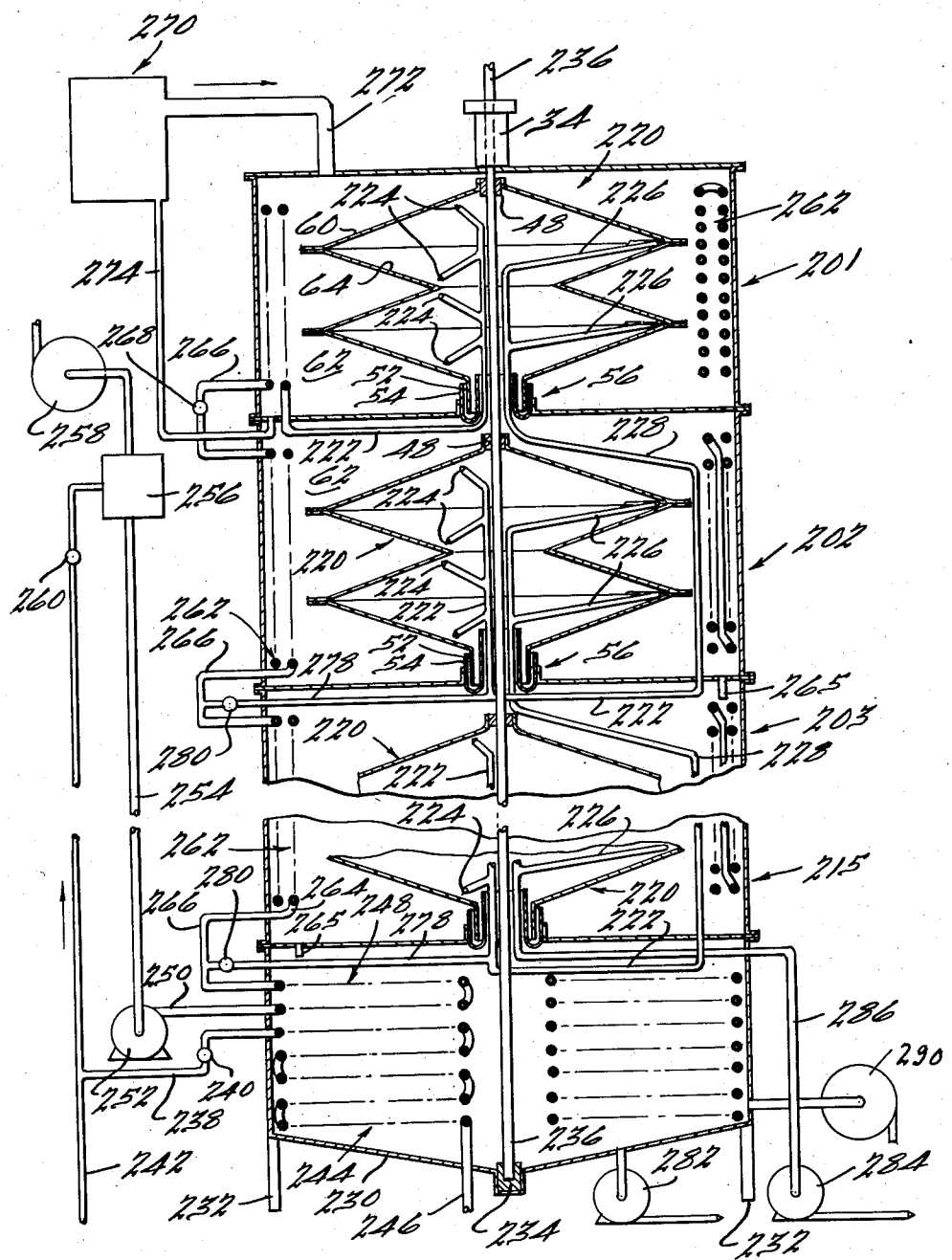
Fig. 2 is a view similar to Fig. 1 showing a modified form of the invention.

In the embodiment of the invention shown in Fig. 2, the construction and operation of the still is like that illustrated in Fig. 1 and such still consists of 15 rotary stages, beginning with stage 201 at the top of the structure and numbered consecutively, progressing downwardly, stages 201, 202 and portions of stages 203 and 215 being illustrated. In this embodiment the barriers 220 at each stage consist of two pair of disks to form double conical barriers of the type previously described. The feed liquid is supplied through pipes 222 and nozzles 224 onto all four of the conical surfaces of each barrier 220 and two scoop tubes 226 within each barrier collect residue therefrom and pass the same into a pipe 228 leading to the distributing pipe 222 of the next lower stage.

The base 230 is supported on legs 232 and supports a thrust bearing 234 receiving the lower end of drive shaft 236 which may be driven from a suitable motor, which is not shown. The base 230 contains two separate heat exchange coils, the lower of which is supplied with cold sea water through pipe 238 under the control of valve 240 and which pipe is connected into the main feed line 242. The other end of the lower heat exchanger 244 is connected to a drain pipe 246. The upper heat exchanger 248 has its inlet connected by a pipe 250 with a pump 252 which is in turn connected to the feed line 242 by a pipe 254 leading from a degasser 256 which may be evacuated by a pump 258. A valve 260 controls the flow of distilland through the feed line 242.

A heat exchange coil 262 is arranged within each stage in the series and the inlet 264 of the coil 262 in the lower stage 215 is connected by a connector pipe 266 with the outlet from the heat exchanger 248. The outlet from each heat exchanger 262 is connected to the inlet or lower end of the exchanger 262 in the next higher stage by a similar connector pipe 266. A valve 268 controls the connection between the heat exchangers in stages 202 and 201. The outlet from the exchanger 262 in stage 201 is connected to distributor 222 which distributes distilland onto the rotor 220 in the first stage.

Steam is supplied to the system from a suitable source indicated at 270 through a pipe 272 opening into the stage 201. If the source of steam is a boiler, for example, it may be supplied with fresh water either from the final distillate or, as indicated in the drawings, by conveying the distillate which is evolved in stage 201 through a pipe 274 back to the boiler 270. The filtered and degassed cold sea water is fed through heat exchanger 248 and then through all of the heat exchangers 262, beginning with the last stage 215 in the series until it reaches the exchanger in stage 201 where it is conveyed by distributor 222 onto the barrier in that stage. The distilland is thus passed in counterflow heat exchange relation with the distillates evolved at the several stages and will be heated to about 225° F. in the exchanger 262 in stage 201 by the steam which may be supplied at about 235°. The vapor evolved on the rotating evaporating surfaces of the barriers 220 passes into the next lower stage as previously described and the residues are likewise passed from each barrier to the evaporating surface of the barrier in the next lower stage. The distillates from all stages except the first stage are passed into the next lower stage by pipes 265.

The residue passed from one stage to the next lower stage is made up to the correct volume by adding thereto additional feed water through pipe 278 which is connected into the connection 266 between the heat exchangers 262 of adjacent stages. A valve 280 controls each pipe 278 to meter the amount of additional feed water added to the system at each stage. As in the previous embodiment of the invention, the stages operate at progressively lower temperatures and pressures and the relative sizes of the barriers and heat exchangers may be varied if desired to accommodate the operating temperatures at each particular stage. It is contemplated that the average temperature drop between stages will be about 10° and that cold sea water at 55° F. will be supplied to the system and heated to about 225° in stage 201. The barriers should be rotated at a speed sufficient to produce efficient evaporation thereon, as described in the above-mentioned patent. Assuming that feed water is supplied at the rate of 2,000 pounds per hour and steam is supplied at a temperature of about 235° F. from an oil-fired boiler and the barriers have about 15 square feet of surface area and are rotated at about 1100 r.p.m., a system of the type shown in Fig. 2 will produce nearly 200 pounds of distilled water per pound of fuel burned. These results compare very favorably with existing compression systems, and the present system has the advantage that the still can be operated on almost any kind of supplied heat and eliminates the compressor cost.

Still greater yields could be obtained by employing more stages and by reducing the temperature drop between stages or by employing higher temperatures or increasing the sizes and speed of rotation of the rotors. The thermal stills disclosed herein might be used in combination with one or more centrifugal compression stills, in which event the source of heat for the thermal stills might be in the form of the exhaust gases from an engine which drives the compression stills. The combined yields from such centrifugal compression stills and the centrifugal thermal stills herein disclosed, in terms of the pounds of distillate produced per pound of fuel burned, would far exceed the yields obtainable from any system at present known in the art.

The steam evolved within the barrier in stage 215 passes downwardly into the hollow base 230 where it is condensed on the heat exchanger 244 which is supplied with cold sea water. The cumulative distillates also pass into the base 230 through pipe 265. Such condensate is removed by pump 282. The final residue is withdrawn by pump 284 through pipe 286. The required pressure reduction through the several stages may be effected by a vacuum pump 290 attached to the last stage in the series.

The temperatures and pressures referred to herein are merely by way of example and may be varied as desired in any particular installation. It is also contemplated that certain of the purging and/or degassing techniques disclosed in my Patent No. 2,734,023 may be employed where desirable to obtain efficient operation of the system.

Figure 3:
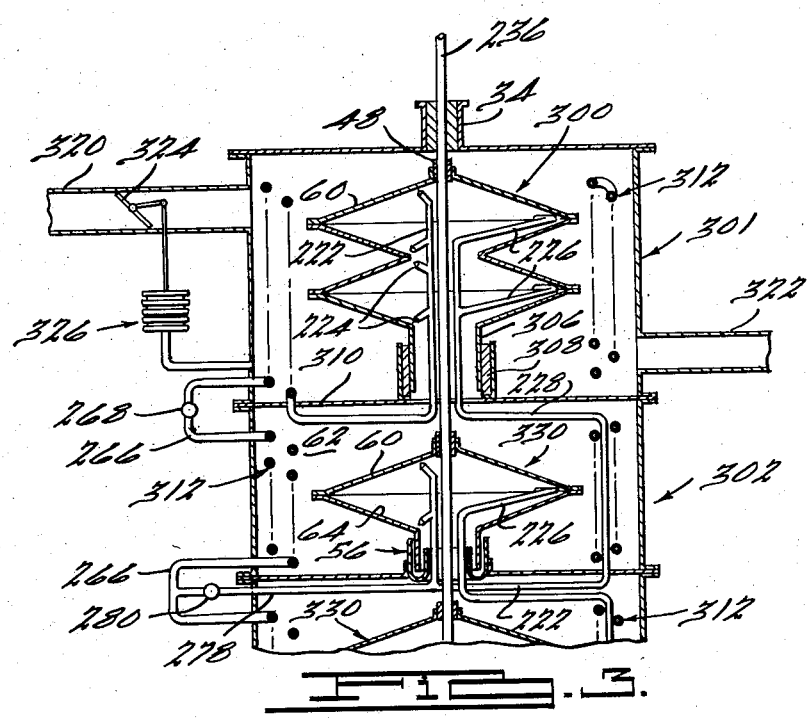
Figure 3 is a similar view showing a further modified form of the invention.
Figure 4:
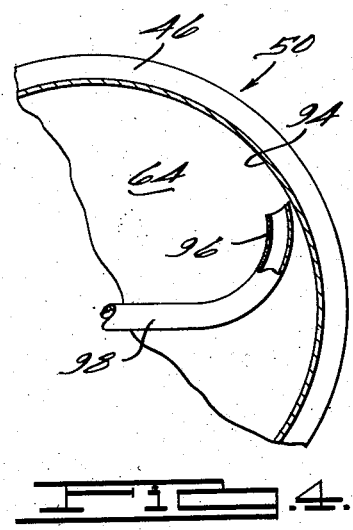
Fig. 4 is a fragmentary sectional view taken on line 4—4 of Fig. 1.

In the embodiment of the invention shown in Fig. 3 the construction and operation is similar to that illustrated in Fig. 2, except that the source of heat is not steam in this instance but may be in the form of hot gases such as might obtained from a furnace or an atomic reactor. In this modification the rotor 300 in stage 301 has a cylindrical 306 engaging a graphite bearing 308 to seal the barrier against the separator plate 310 between stage 301 and stage 302. The feed water is supplied through heat exchangers 312 as in the Fig. 2 modification and the residues and distillates are again passed through the successive stages in the series in the manner described. The hot gases for adding heat to the system are supplied through a pipe 320 opening into stage 301 and the gases are removed from stage 301 through exhaust pipe 322. A damper 324 in inlet pipe 320 may be provided for regulating the quantity or temperature of the hot gases within the first stage. Such valve 324 is controlled by a pressure responsive device 326 so that the pressure of the steam in stage 302 will always be somewhat greater than the pressure of the gases in stage 301 so as to prevent contamination of the system by the hot flue gases or other source of heat. The barrier 300 in stage 301 is illustrated as having a larger area than the barriers 330 in the succeeding stages since the heat transfer coefficient may be less when flue gases are employed than when steam is employed as in the previous modifications. The construction and operation of the embodiment shown in Fig. 3 is otherwise similar to that described in Fig. 2.

While the invention has been illustrated in the form of a unitary apparatus separated into a series of distilling stages, it is contemplated that each stage may consist of a separate still having a rotary phase separation barrier with the evolved vapor from each still being supplied to the condensing surface of the barrier in the next still in the series. The residues and distillates are preferably passed from each stage to the succeeding stage in the series, as described herein, but in some applications it may be possible to draw off the residue and/or distillate at each stage and to use the heat thereof to heat the distilland or feed liquid.

A still constructed according to the foregoing description will obtain relatively large volumes of distilled water per unit of energy put into the system and an additional feature of the invention is that scaling and corrosion when sea water is distilled, for example, are substantially reduced since the temperatures involved are not high and only a small percentage of the distillate is evolved at any one stage so that the concentration of salt in the residue is not excessive and exceeds 10 percent only when the lower stages are reached or when the temperature is below about 120° F.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. Multiple effect distillation apparatus comprising a casing structure, means dividing the casing structure into a series of successive distilling stages, a rotary phase separation barrier of high thermal conductivity in each stage, each barrier separating its stage into a condensing chamber with one side of the barrier forming a condensing surface exposed therein and an evaporating chamber with the other side of the barrier forming an evaporating surface exposed therein, means for supplying distilland onto the evaporating surface of the barrier in the first stage in the series to evolve vapor therefrom, means for supplying heat to the first stage in the series to promote evaporation of the distilland supplied thereto, means for collecting the residue of the distilland from each evaporating chamber and conveying such residue to the evaporating surface of the barrier in the succeeding stage in the series, means for rotating said barriers at such speed as to cause distilland supplied thereto to flow radially outwardly in a thin film over said evaporating surfaces, means for conveying evolved vapor from each evaporating chamber to the condensing chamber of the succeeding stage, means for conveying distillate from each condensing chamber to the condensing chamber of the succeeding stage, means for adding distilland to the residue supplied to the evaporating surfaces of the barriers in the successive stages, and means for withdrawing the distillate from the last stage in the series.

2. Multiple effect distillation apparatus comprising a casing structure, means dividing the casing structure into a series of successive distilling stages, a rotary phase separation barrier of high thermal conductivity in each stage, means for rotating said barriers, each barrier separating its stage into a condensing chamber with one side of the barrier forming a condensing surface exposed therein and an evaporating chamber with the other side of the barrier forming an evaporating surface exposed therein, a heat exchange coil in the condensing chamber of the first stage in the series, means for supplying distilland to said coil, a conduit for conveying distilland from said coil onto the evaporating surface of the barrier in the first stage in the series to evolve vapor therefrom, means for supplying heat to the condensing chamber in the first stage in the series to heat said distilland and promote evaporation thereof, means for collecting the residue of the distilland from each evaporating chamber and conveying such residue to the evaporating surface of the barrier in the succeeding stage in the series, means for conveying evolved vapor from each evaporating chamber to the condensing chamber of the succeeding stage, means for conveying distillate from each condensing chamber to the condensing chamber of the succeeding stage, means for supplying additional distilland to the evaporating surfaces of the barriers in the successive stages, and means for withdrawing the distillate from the last stage in the series.

3. Multiple effect distillation apparatus comprising a casing structure, means dividing the casing structure into a series of successive distilling stages, a phase separation barrier of high thermal conductivity in each stage, each barrier separating its stage into a condensing chamber with one side of the barrier forming a condensing surface exposed therein and an evaporating chamber with the other side of the barrier forming an evaporating surface exposed therein, means for supplying distilland onto the evaporating surface of the barrier in the first stage in the series to evolve vapor therefrom, means for supplying heat to the first stage in the series to heat and promote evaporation of the distilland supplied to the barrier in said first stage, means for collecting the residue of the distilland from each evaporating chamber and conveying such residue to the evaporating surface of the barrier in the succeeding stage in the series, means for rotating said barriers at such speed as to cause distilland to spread and flow over said evaporating surfaces in a film substantially thinner than can be obtained by the flow of such distilland of the same throughput over the same surface under the force of gravity alone, means for conveying evolved vapor from each evaporating chamber to the condensing chamber of the succeeding stage, means for supplying additional distilland to the evaporating surfaces of the barriers in the successive stages, and means for withdrawing the distillate from the last stage in the series.

4. Multiple effect distillation apparatus comprising means providing a series of successive distilling stages, a phase separation barrier of high thermal conductivity in each stage, each barrier having one side forming a condensing surface and the other side forming an evaporating surface, means for supplying distilland onto the evaporating surface of the barrier in the first stage in the series to evolve vapor therefrom, means for supplying heat to the first stage in the series to heat and promote evaporation of the distilland supplied to such barrier, means for collecting the residue of the distilland from each evaporating surface and conveying such residue to the evaporating surface of the barrier in the succeeding stage in the series, means for flowing distilland over said evaporating surfaces in a thin film, means for conveying vapor evolved from the evaporating surface of each barrier to the succeeding stage, means for conveying distillate from each stage to the succeeding stage, and means for supplying additional distilland to the evaporating surfaces of the barriers in the successive stages.

5. Multiple effect distillation apparatus comprising means providing a series of successive distilling stages, each stage including a hollow phase separation barrier of high thermal conductivity having one side forming a condensing surface and the other side forming an evaporating surface, means for rotating said barriers, means for supplying distilland onto the evaporating surface of the barrier in the first stage in the series to evolve vapor therefrom, means for collecting the residue of the distilland from each evaporating surface and conveying such residue to the evaporating surface of the barrier of the succeeding stage in the series, means for conveying evolved vapor from each evaporating surface to the condensing surface of the succeeding stage, means for conveying distillate from each stage into heat exchange relation with the condensing surface of the barrier in the succeeding stage, means for adding distilland to the residue supplied to the evaporating surfaces of the barriers in the successive stages, means for withdrawing the distillate from the last stage in the series, and means for supplying heat to the first stage to heat and promote evaporation of the distilland supplied thereto.

6. Multiple effect distillation apparatus comprising means providing a series of successive distilling stages, means for supplying distilland to each stage, means for supplying heat to the first stage in the series, means in each stage for spreading the distilland supplied thereto in a film substantially thinner than can be obtained by flow of such distilland under the influence of gravity alone to evaporate such distilland, means for collecting the residue of the distilland from each stage and mixing such residue with the distilland supplied to the succeeding stage in the series, means for conveying vapor evolved in each stage to the succeeding stage, means in each stage for condensing the vapor supplied thereto from the preceding stage, means for conveying distillate from each stage to the succeeding stage, and means for withdrawing the cumulative distillate from the last stage in the series.

7. Multiple effect distillation apparatus comprising a casing structure, means dividing the casing structure into a series of successive distilling stages, a rotary phase separation barrier of high thermal conductivity in each stage, each barrier separating its stage into a condensing chamber with one side of the barrier forming a condensing surface exposed therein and an evaporating chamber with the other side of the barrier forming an evaporating surface exposed therein, a heat exchanger in the first stage in the series, means for supplying distilland to said heat exchanger, a conduit for conveying distilland from said heat exchanger onto the evaporating surface of the barrier in the first stage in the series to evolve vapor therefrom, means for supplying heat to the first stage in the series to heat the distilland in said heat exchanger and promote evaporation thereof on said evaporating surface, means for collecting the residue of the distilland from each evaporating chamber and conveying such residue to the evaporating surface of the barrier in the succeeding stage in the series, means for subjecting the liquid on said evaporating surfaces to a force many times in excess of the force of gravity so as to cause such distilland to spread and flow over said surfaces in a thin film, means for conveying vapor evolved from each evaporating chamber to the condensing chamber of the succeeding stage, means for adding distilland to the residues supplied to the evaporating surfaces of the barriers in the successive stages, means for withdrawing distillates, and means for withdrawing residue from the last stage in the series.

8. Distillation apparatus according to claim 7 including a heat exchanger over which the vapor evolved in said last stage is passed for condensing such vapor.

9. Multiple effect distillation apparatus comprising means providing a series of successive distilling stages, a phase separation barrier of high thermal conductivity in each stage, each barrier having one side forming a condensing surface and the other side forming an evaporating surface, means for spreading and flowing distilland in a thin film over the evaporating surfaces of the barriers in said stages to evolve vapor therefrom, means for supplying heat to the first stage in the series, means for collecting the residue of the distilland from each evaporating surface and adding such residue to the distilland supplied to the evaporating surface of the barrier in the succeeding stage in the series, means for conveying evolved vapor from each evaporating surface into heat exchange relation with the condensing surface of the succeeding stage, means for conveying distillate from each stage into heat exchange relation with the condensing surface of the barrier in the succeeding stage in the series, means for withdrawing the distillate from the last stage in the series, and means for withdrawing residue from the last stage in the series.

10. The method of distilling liquids which comprises continually evaporating distilland in each of a series of separate distilling stages, supplying heat to the first stage in the series, conveying vapor evolved from the distilland in each stage to the succeeding stage in the series, mixing the undistilled residue from each stage with the distilland supplied to the succeeding stage in the series, conducting the distillate from each stage into the succeeding stage in the series and withdrawing the cumulative distillates from the last stage in the series.

11. The method of distilling liquids which comprises rotating a series of separate phase separation barriers each having a condensing surface and an evaporating surface thereon, supplying heat to the first barrier in the series, supplying distilland onto the evaporating surface of the first barrier in the series to evolve vapor therefrom, conducting vapor evolved from each barrier into heat exchange relation with the condensing surface of the succeeding barrier in the series, conveying undistilled residues from each barrier to the evaporating surface of the succeeding barrier in the series, adding distilland to said residues, and conducting the distillate condensed on each barrier into heat exchange relation with the condensing surface of the succeeding barrier in the series.

12. The method of distilling liquids which comprises providing a series of distilling stages and rotating a phase separation barrier having a condensing surface and an evaporating surface thereon in each stage, supplying heat to the first stage in the series, supplying distilland onto the evaporating surface of the barrier in the first stage to evolve vapor therefrom, conducting the vapor evolved from each barrier to the condensing surface of the barrier in the succeeding stage in the series, conveying the undistilled residues from each barrier to the evaporating surface of the barrier in the succeeding stage in the series, and adding additional distilland to the residues supplied to the evaporating surfaces of the barriers in the succeeding stages.

13. The method of distilling liquids which comprises continuously feeding distilland onto the evaporating surfaces of each of a series of separate phase separation barriers each having a condensing surface and an evaporating surface thereon, supplying heat to the first barrier in the series, rotating said barriers at a speed sufficient to cause the distilland to flow over said evaporating surfaces in a thin film to evolve vapor therefrom, and conducting vapor evolved from each barrier in the series into heat exchange relation with the condensing surface of the succeeding barrier in the series to promote evaporation of the distilland supplied thereto, said method being characterized in that each of said barriers is rotated at such a speed so as to continuously apply centrifugal force of at least ten times gravity to the liquid on the evaporating side of said barrier and to the distillate formed by the vapor as it condenses on the opposite condensing surface of said barrier so as to maintain each of said liquids in a film on said barrier substantially thinner than a film of the same liquid of the same throughput flowing on the same surface under the influence of gravity alone.

14. In a multiple effect still having a series of successive distilling stages, a series of rotary heat exchange and phase separation barriers of high thermal conductivity, one for each stage, each barrier having an integral evaporating and condensing surface disposed in heat exchange relation and so that upon the rotation thereof centrifugal force will be applied to liquid disposed on said surfaces, means for continuously supplying distilland to the evaporating surfaces of said heat exchangers at a rate in excess of that required to wet said evaporating surfaces, said evaporating surfaces being arranged so that upon rotation thereof such distilland will be free to spread and flow on such surfaces under the forces applied to such distilland, means for rotating said barriers at a speed sufficient to continuously spread and flow distilland on each of said evaporating surfaces in a film substantially thinner than that which can be secured by a flow of such distilland of the same throughput on the same surface under the influence of gravity alone; to maintain the distilland on each of said evaporating surfaces continuously under forces many times greater than gravity; and to centrifugally discharge the residue from each of said evaporating surfaces, said means for supplying distilland to said evaporating surfaces including provisions for conveying residue discharged from the evaporating surface of each of said barriers to the evaporating surface of the next one of said barriers in the series, means for transferring vapor evolved by each of said flowing films of distilland into heat exchange relation with the condensing surface of the next of said rotating barriers of said series so as to condense said vapor on said condensing surface and to transfer the heat of condensation thereof to said flowing film on said evaporating surface of said next barrier to effect the evolution of vapor therefrom, said barriers being constructed so that such rotation thereof separates such condensate from said condensing surface as it condenses thereon so as to prevent the accumulation of condensate thereon and to maintain such condensate on said condensing surface in a film substantially thinner than a film of such condensate of the same throughput on the same surface flowing under the influence of gravity alone, means for supplying heat to the first barrier in said series to promote the evaporation of distilland supplied to the evaporating surface thereof, and means for withdrawing heat from the vapor evolved in the last stage in the series.

15. In a multiple effect still having a series of successive distilling stages, a series of heat exchange and phase separation barriers of high thermal conductivity, one for each stage, each barrier having an integral evaporating and condensing surface disposed in heat exchange relation, means for continuously supplying distilland to each of said evaporating surfaces at a rate in excess of that required to wet said evaporating surface, each of said evaporating surfaces being arranged so that such distilland is free to spread and flow on such evaporating surface, means for applying force of a magnitude many times in excess of gravity to such distilland so as to spread and flow such distilland on each of said evaporating surfaces in a film substantially thinner than that which can be secured by a flow of such distilland of the same throughput on the same surface flowing under the influence of gravity alone thereby to substantially reduce the resistance to evolution of vapor from said distilland and forcibly discharge the residue from said evaporating surface, said means for applying distilland to said evaporating surfaces including provisions for conveying residue discharged from the evaporating surface of each of said barriers to the evaporating surface of the next one of said barriers in the series, means for directing vapor evolved by such flowing film of distilland on the evaporating surface of each barrier into intimate heat exchange relation with the condensing surface of the next barrier in the series so as to condense said vapor on said condensing surface and to transfer the heat of condensation thereof to the flowing film on the evaporating surface of such barrier to effect the evolution of vapor therefrom, means for separating such condensate from each of said condensing surfaces as it condenses thereon so as to prevent the accumulation of condensate thereon and to maintain said condensate on said condensing surface in a film substantially thinner than a film of such condensate of the same throughput on the same surface flowing under the influence of gravity alone, and means for withdrawing heat from the vapor evolved in the last stage in the series.

16. In a multiple effect still having a series of successive distilling stages, a series of rotary phase separation barriers and heat exchangers of high thermal conductivity, one for each stage, each barrier and heat exchanger having an integral evaporating surface on one side, a condensing surface on the opposite side, and a collecting trough so disposed with respect to said evaporating surface as to collect and confine liquid discharged therefrom and to prevent dispersion of said liquid in the form of a spray, means for continuously applying distilland to each of said evaporating surfaces at a rate in excess of that required to wet said evaporating surfaces, each of said evaporating surfaces being arranged so that such distilland will be free to spread and flow on such evaporating surface under the force applied thereto upon rotation of said barrier, means for rotating each of said barriers at a speed sufficient to continuously apply to said distilland on the evaporating surface thereof, centrifugal force of a magnitude many times in excess of the force of gravity acting on the distilland on said evaporating surface, so as to spread and flow such distilland continuously on said evaporating surface in a film substantially thinner than that which can be secured by a flow of such distilland of the same throughput on the same surface flowing under the influence of gravity alone, and so as continuously to discharge the residue from said evaporating surface into the collecting trough therefor thereby to separate the residue from the distilland, said evaporating surface and the vapor evolved therefrom, said means for applying distilland to said evaporating surfaces including provisions for conveying residue from the collecting trough of each of said barriers to the evaporating surface of the next one of said barriers in the series, means for directing vapor evolved by the flowing film of distilland on each of said evaporating surfaces into intimate heat exchange relation with the condensing surface of the next of said rotating barriers of said series so as to condense said compressed vapor on said condensing surface and to transfer the heat of condensation thereof to the flowing film on the evaporating surface of said next barrier to effect the evolution of vapor therefrom, each of said barriers being constructed so that such rotation is effective to fling condensate from the condensing surface thereof as it condenses thereon and means for withdrawing heat from the vapor evolved in the last stage of the series.

17. A multiple effect still according to claim 15 including a heat exchanger passing through said stages progressively from the last stage to the first in the series whereby said distilland is progressively heated as it passes through said stages.

18. A multiple effect still according to claim 15 including means for adding distilland to the residue supplied to the evaporating surfaces of each barrier in the successive stages beginning with the second stage thereof.

19. A multiple effect still according to claim 16 wherein said stages are arranged in a casing, a wall separates each stage, a common shaft extends through said wall and casing and is connected to said barriers for rotating the same, a tubular member mounted on each of said walls and forms a communication between the evaporating zone of each stage and the condensing zone of the succeeding stage, and a liquid seal is provided between each of said tubular members and the barrier of such evaporating zone.

References Cited in the file of this patent

UNITED STATES PATENTS

| 1,069,829 | Thoens | Aug. 12, 1913 |
| 2,010,929 | Reich | Aug. 13, 1935 |
| 2,734,023 | Hickman | Feb. 7, 1956 |

FOREIGN PATENTS

| 161,651 | Australia | Mar. 3, 1955 |